US009990821B2

United States Patent
Wang et al.

(10) Patent No.: US 9,990,821 B2
(45) Date of Patent: Jun. 5, 2018

(54) METHOD OF RESTORING CAMERA POSITION FOR PLAYING VIDEO SCENARIO

(71) Applicant: Honeywell International Inc., Morristown, NJ (US)

(72) Inventors: Peng Wang, Shanghai (CN); Zhenxing Guo, Shanghai (CN); Lianfeng Zhao, Shanghai (CN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 246 days.

(21) Appl. No.: 14/638,541

(22) Filed: Mar. 4, 2015

(65) Prior Publication Data
US 2016/0260300 A1 Sep. 8, 2016

(51) Int. Cl.
 H04N 7/18 (2006.01)
 G08B 13/196 (2006.01)
 H04N 5/232 (2006.01)
 H04N 5/247 (2006.01)

(52) U.S. Cl.
CPC ... *G08B 13/19689* (2013.01); *G08B 13/1963* (2013.01); *G08B 13/1968* (2013.01); *G08B 13/19645* (2013.01); *H04N 5/23216* (2013.01); *H04N 5/23293* (2013.01); *H04N 7/181* (2013.01); *H04N 5/247* (2013.01)

(58) Field of Classification Search
CPC .................................................. G08B 13/19689
USPC ............................................................ 348/159
See application file for complete search history.

(56) References Cited

U.S. PATENT DOCUMENTS

| 2007/0115355 | A1* | 5/2007 | McCormack | G06T 7/0018 |
| | | | | 348/143 |
| 2008/0036860 | A1 | 2/2008 | Addy | |
| 2008/0291279 | A1* | 11/2008 | Samarasekera | G08B 13/19693 |
| | | | | 348/159 |
| 2013/0021433 | A1 | 1/2013 | Belsarkar et al. | |
| 2014/0240455 | A1* | 8/2014 | Subbian | H04N 7/183 |
| | | | | 348/39 |

FOREIGN PATENT DOCUMENTS

EP 2 770 733 A1 8/2014

OTHER PUBLICATIONS

Extended European search report from corresponding EP patent application 16156407.5, dated Jul. 5, 2016.

\* cited by examiner

*Primary Examiner* — Hung Dang
*Assistant Examiner* — Girumsew Wendmagegn
(74) *Attorney, Agent, or Firm* — Husch Blackwell LLP

(57) ABSTRACT

An apparatus is provided that includes a plurality of pan-tilt-zoom (PTZ) cameras, each of the plurality of PTZ cameras having a respective field of view that covers a respective portion of a secured geographic area, a memory that saves a plurality of surveillance scenarios, each of the plurality of surveillance scenarios including a respective pan, tilt, and a zoom position for each of the plurality of PTZ cameras, and a user interface that receives a selection of one of the plurality of surveillance scenarios from a human user and, in response, simultaneously displays respective real time video images from each of the plurality of PTZ cameras using the respective pan, tilt, and zoom positions of the one of the plurality of surveillance scenarios.

19 Claims, 3 Drawing Sheets

Operator A operates on PTZ camera to adjust camera view field to proper position and save current view as a scenario Operator B operates on PTZ camera to view specific area he/she interested Operator A play the scenario with saved scenario name, all PTZ cameras will be reset to the position when the scenario saved

METHOD OF RESTORING CAMERA POSITION FOR PLAYING VIDEO SCENARIO

FIELD

This application relates to security systems, and more particularly, to surveillance systems.

BACKGROUND

Systems are known to protect people and assets within secured areas. Such systems are typically based upon the use of one or more sensors that detect threats within the secured areas.

Threats to people and assets may originate from any of a number of different sources. For example, a fire may kill or injure occupants who have become trapped by a fire in a home. Similarly, carbon monoxide from a fire may kill people in their sleep.

Alternatively, an unauthorized intruder, such as a burglar, may present a threat to assets within an area. Intruders have also been known to injure or kill people living within the area.

In the case of intruders, sensors may be placed in different areas based upon the respective uses of those areas. For example, if people are present during some portions of a normal day and not at other times, then sensors may be placed along a periphery of a space to provide protection while the space is occupied while additional sensors may be placed within an interior of the space and used when the space is not occupied.

In most cases, threat sensors are connected to a local control panel. In the event of a threat detected via one of the sensors, the control panel may sound a local audible alarm. The control panel may also send a signal to a central monitoring station.

While security systems work well, they are sometimes difficult to set up and use, especially where a system includes a number of security cameras that must be constantly monitored. Accordingly, a need exists for better methods of using such systems.

DETAILED DESCRIPTION

Figure 1:
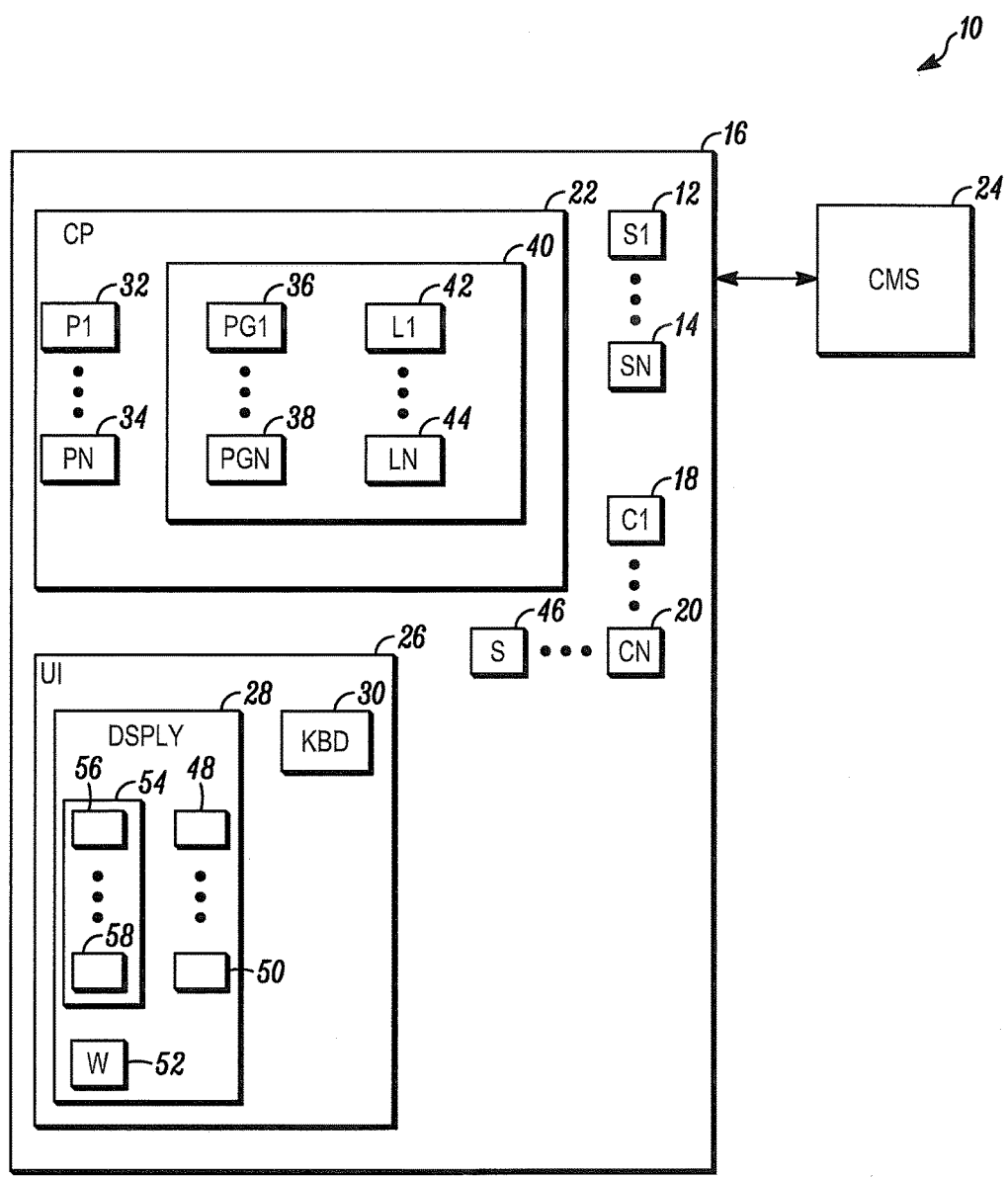
FIG. 1 is a block diagram of a system in accordance herewith.

While disclosed embodiments can take many different forms, specific embodiments thereof are shown in the drawings and will be described herein in detail with the understanding that the present disclosure is to be considered as an exemplification of the principles thereof as well as the best mode of practicing the same and is not intended to limit the application or claims to the specific embodiment illustrated.

FIG. 1 is a block diagram of a security system 10 shown generally in accordance with an illustrated embodiment. Included within the system may be one or more sensors 12, 14 that detect threats within a secured area 16.

The sensors may be embodied in any of a number of different formats. For example, some of the sensors may be limit switches placed on doors and windows along a periphery of the secured area to detect intruders. Others of the sensors may be passive infrared (PIR) detectors placed within an interior of the secured area in order to detect intruders who have been able to circumvent the sensors along the periphery.

Intrusion detection may be supplemented (or, in some cases, replaced) by a number of pan-tilt-zoom (PTZ) cameras 18, 20. The cameras may be placed along the periphery of the secured area or within the interior and may include motion detection capabilities.

The sensors and cameras may be monitored by a control panel 22 located within the secured area (as shown in FIG. 1) or located remotely. Upon activation of one of the sensors, the control panel may compose and send an alarm message to a central monitoring station 24. The central monitoring station may respond by summoning the appropriate help (e.g., police, fire department, etc.).

The security system may be controlled via a user interface 26. The user interface may include a display 28 that displays status information for the security system and a keyboard 30 for entry of instructions.

For example, in order to arm the system, an authorized user may activate a function key on the keyboard (e.g., an arm key). In order to disarm the system, the user may enter a personal identification number (PIN) and activate a disarm key.

Included within the control panel, the sensors, the cameras and the user interface may be one or more processor apparatuses (processors) 32, 34, each operating under control of one or more computer programs 36, 38 loaded from a non-transitory computer readable medium (memory) 40. As used herein, reference to a step performed by a computer program is also reference to the processor that executed that step.

In this regard, a status processor may monitor the keyboard for instructions from the user. Upon receiving an arm command, the status processor may cause the security system to enter an armed state. Once armed, an alarm processor may monitor each of the sensors. Upon the activation of the one of the sensors, the alarm processor may activate a local alarm and compose and send the alarm message to the central monitoring station.

Also, operating in the background may be a video display processor. The video display processor may display a number of video display icons 48, 50 superimposed on the display. Upon activation of one or more of the icons, real time video from one or more of the cameras may be shown on the display within windows 52.

Also, associated with the each of the windows may be respective pan, tilt, and zoom controls for each of the cameras shown in a respective one of the windows of the display. Using the respective pan, tilt, and zoom controls, the user can adjust a respective field of view (FOV) of each of the cameras to cover a respective portion of the secured area (e.g., the interior of a building). For example, the user may train the respective field of view of a first camera on a main entrance into the secured area. Other cameras may be trained on secondary entrances and/or fire exits. Other cameras may be trained on main corridors or places where people congregate.

During normal operations within the secured area, the user (e.g., a guard) working through the user interface (e.g., a guard station) may adjust the respective field of view of one or more of the cameras based upon surveillance needs.

For example, if the guard should notice a suspicious person enter the area, then the guard may adjust the pan, tilt, and zoom of one or more of the cameras to track the person from the main entrance through the interior of the building. Similarly, if an after-hours event were to be held in a portion of a facility, then the guard may train the cameras in such a way as to alert the guard if anyone were to leave the portion of the facility and head towards restricted areas.

In still another example, the secured area may be a manufacturing facility having one or more buildings where manufacturing only occurs during a portion of the day. In this case, the guard may use a first FOV layout or surveillance scenario during the day when manufacturing is occurring and a second FOV layout at night when the facility is unoccupied.

Under one illustrated embodiment, each one of individual camera scenarios may be assigned a name and saved into a respective file 42, 44 in the memory. A respective one of the individual camera scenarios may be selected by the guard by activating an indicator of a respective layout (e.g., the respective name of the respective one of the individual camera scenarios) shown on a screen of the display.

Under one illustrated embodiment, each of the cameras (camera assembly) includes a respective sensor 46 for pan, tilt, and zoom (PTZ) positions of a respective one of the cameras. Alternatively, a camera controller measures an offset from a reference position.

Each of the individual camera scenarios is defined by the respective pan, tilt, and zoom position of each of the cameras included within the respective layout. In order to save the respective layout or the respective one of the individual camera scenarios, the user may select each of the cameras to be included within the respective one of the individual camera scenarios and activate a scenario save button. Alternatively, the user may activate a scenario all save icon and enter a file name to save the respective PTZ positions of all of the cameras operating within the secured area into a common file along with the file name.

In order to view any one of the individual camera scenarios, the user may activate a select scenarios icon. In response, a scenarios processor may present a menu 54 including a list of names 56, 58 of saved scenarios on the display. Upon selecting one of the names from the menu, the scenarios processor may open an array of windows, including a respective one of the windows for each of the cameras included within a selected one of the saved scenarios.

The scenarios processor may then send PTZ instructions to each of the cameras associated with the selected one of the saved scenarios instructing those cameras to assume the respective PTZ positions of the selected one of the saved scenarios. The same or another processor may then capture respective real time images from each of those cameras and simultaneously show the respective real time images within the respective one of the windows of the array.

In general, the ability to play video scenarios is a common feature in many conventional video management systems. In such systems, a user can play multiple video streams in a specific window layout and save the specific window layout with a given scenario name. When the user calls this scenario using the scenario name, the video streams of cameras of the scenario will be played in the specific window layout. This is a very quick way to recall multiple video streams in order to do live monitoring.

However, this common feature of conventional systems does not work with PTZ cameras. For example, if PTZ cameras are used within the scenario, then PTZ positions of the PTZ cameras may be randomly changed while the user is performing normal surveillance activities. However, viewing fields (the PTZ positions) of the PTZ cameras at the end of viewing operations may differ from when the scenario was saved. Selection of the scenario in these conventional systems merely involves the selecting the PTZ cameras with whatever PTZ positions that were previously set or otherwise present within the PTZ cameras. The operator would then be required to spend considerable time in adjusting the PTZ positions to achieve a desired surveillance view.

Under the system of FIG. 1, when a video scenario is saved, PTZ positions of each PTZ camera in the scenario are saved along with an identifier of each PTZ camera and a scenario name. When a user plays this scenario, each PTZ camera will be called along with its preset PTZ positions saved in memory under this scenario. Using this method, a view of a viewed scenario will be exactly the same as when the viewed scenario was saved.

Figure 2A:
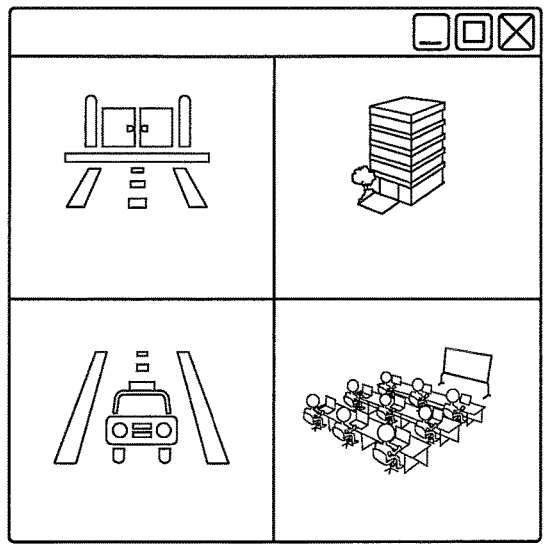
FIG. 2A is a first viewing scenario that may be used with the system of FIG. 1.

In a more particular example, an Operator A may adjust fields of view of a set of cameras to achieve the fields of view of four cameras shown in FIG. 2A. The Operator A may save the viewing scenario shown in FIG. 2A under the name Operator A.

Figure 2B:
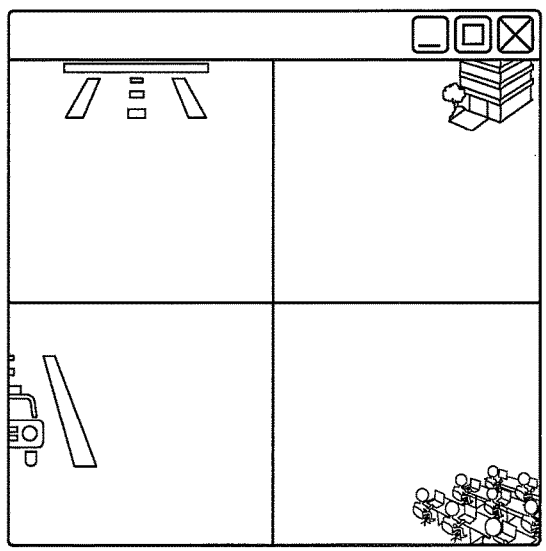
FIG. 2B is a second viewing scenario that may be used with the system of FIG. 1.

Later (e.g., during a subsequent shift), an Operator B may adjust the viewing scenario to that shown in FIG. 2B. The Operator B may do this because he/she is observing a suspicious object, tracking some object or objects, or for some entirely different reason.

Figure 3:
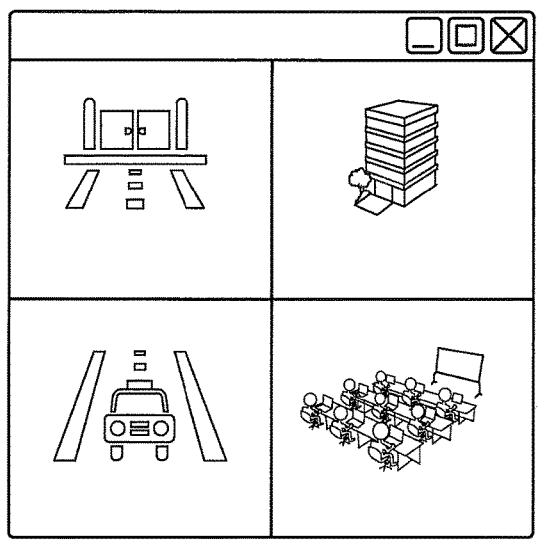
FIG. 3 is a restored viewing scenario that may be used with the system of FIG. 1.

Still later, the Operator A (or even the Operator B) may activate a view scenarios icon and select the viewing scenario labeled Operator A. In response, the viewing scenario shown in FIG. 3 would be displayed. It should be noted, in this regard, that the viewing scenario shown in FIG. 3 is exactly the same as the viewing scenario shown in FIG. 2A.

In general, the system of FIG. 1 includes a plurality of pan-tilt-zoom (PTZ) cameras, each of the plurality of PTZ cameras having a respective field of view that covers respective a portion of a secured geographic area, a memory that saves a plurality of surveillance scenarios, each of the plurality of surveillance scenarios including a respective pan, tilt, and zoom position for each of the plurality of PTZ cameras and a user interface that receives a selection of one of the plurality of surveillance scenarios from a human user and, in response, simultaneously displays respective real time video images from each of the plurality of PTZ cameras using the respective pan, tilt, and zoom positions of the one of the plurality of surveillance scenarios.

Alternatively, the system may include a security system that protects a secured geographic area, a plurality of pan-tilt-zoom (PTZ) cameras of the security system, each of the plurality of PTZ cameras having a respective field of view that covers a respective portion of the secured geographic area, a plurality of sets of PTZ positions saved in a memory, each of the plurality of sets of PTZ positions including a respective pan, tilt, and zoom position for each of the plurality of PTZ cameras, and a user interface that receives a selection of one of the plurality of sets of PTZ positions from a human user and, in response, simultaneously displays respective real time video images from each of the plurality of PTZ cameras using the respective pan, tilt, and zoom positions of the one of the plurality of sets of PTZ positions.

Alternatively, the system may include a security system that protects a secured geographic area, a plurality of pan-tilt-zoom (PTZ) cameras of the security system, each of the plurality of PTZ cameras having a respective field of view that covers a respective portion of the secured geographic area, a user interface of the security system that respective displays images from each of the plurality of PTZ cameras, and a plurality of sets of PTZ positions saved in a memory, wherein each of the plurality of sets of PTZ positions includes a respective pan, tilt, and zoom position for each of the plurality of PTZ cameras, and wherein the user interface that receives a selection of one of the plurality of sets of PTZ positions from a human user and, in response, simultaneously displays real time video images from each of the plurality of PTZ cameras on the user interface based upon the saved pan, tilt and zoom positions of the one of the plurality of sets of PTZ positions.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims. Further, logic flows depicted in the figures do not require the particular order shown or sequential order to achieve desirable results. Other steps may be provided, steps may be eliminated from the described flows, and other components may be added to or removed from the described embodiments.

The invention claimed is:

1. An apparatus comprising:
    a plurality of pan-tilt-zoom cameras, wherein each of the plurality of pan-tilt-zoom cameras has a respective field of view that covers a respective portion of a secured geographic area;
    a plurality of surveillance scenarios saved in a memory, wherein each of the plurality of surveillance scenarios includes a respective previously selected group of included ones of the plurality of pan-tilt-zoom cameras and respective pan, tilt, and zoom positions for each of the respective previously selected group of the included ones of the plurality of pan-tilt-zoom cameras; and
    a user interface that receives user input selecting one of the plurality of surveillance scenarios from a menu displayed on the user interface and, simultaneously therewith, displays real time video images from the respective previously selected group of the included ones of the plurality of pan-tilt-zoom cameras of the one of the plurality of surveillance scenarios and orients the respective previously selected group of the included ones of the plurality of pan-tilt-zoom cameras of the one of the plurality of surveillance scenarios to the respective pan, tilt, and zoom positions.

2. The apparatus as in claim 1 wherein the memory includes respective scenario files for each of the plurality of surveillance scenarios, and wherein the respective scenario files for each of the plurality of surveillance scenarios include the respective pan, tilt, and zoom positions.

3. The apparatus as in claim 2 wherein each of the respective scenarios files for each of the plurality of surveillance scenarios includes a respective name.

4. The apparatus as in claim 3 further comprising a processor that displays the menu on the user interface including the respective name of each of the respective scenario files for each of the plurality of surveillance scenarios.

5. The apparatus as in claim 4 wherein the user input includes selecting the respective name of one of the respective scenario files for the one of the plurality of surveillance scenarios.

6. The apparatus as in claim 1 wherein the respective pan, tilt, and zoom positions for at least the one of the plurality of surveillance scenarios directs at least some of the respective previously selected group of the included ones of the plurality of pan-tilt-zoom cameras onto a common area of the secured geographic area.

7. The apparatus as in claim 6 wherein the common area includes an entrance into or egress from the secured geographic area.

8. The apparatus as in claim 1 further comprising a security system.

9. The apparatus as in claim 8 further comprising a processor of the security system that displays security breaches on the user interface.

10. An apparatus comprising:
    a security system that protects a secured geographic area;
    a plurality of pan-tilt-zoom cameras of the security system, wherein each of the plurality of pan-tilt-zoom cameras has a respective field of view that covers a respective portion of the secured geographic area;
    a plurality of layouts saved in a memory, wherein each of the plurality of layouts includes a respective previously selected group of included ones of the plurality of pan-tilt-zoom cameras and respective pan, tilt, and zoom positions for each of the respective previously selected group of the included ones of the plurality of pan-tilt-zoom cameras; and
    a user interface that receives user input selecting one of the plurality of layouts from a menu displayed on the user interface and, simultaneously therewith, displays real time video images from the respective previously selected group of the included ones of the plurality of pan-tilt-zoom cameras of the one of the plurality of layouts and orients the respective previously selected group of the included ones of the plurality of pan-tilt-zoom cameras of the one of the plurality of layouts to the respective pan, tilt, and zoom positions.

11. The apparatus as in claim 10 further comprising a processor that retrieves the one of the plurality of layouts and sends the respective pan, tilt, and zoom positions to each of the respective previously selected group of the included ones of the plurality of pan-tilt-zoom cameras of the one of the plurality of layouts.

12. The apparatus as in claim 10 wherein the user interface is part of the security system.

13. The apparatus as in claim 10 wherein the real time video images from the respective previously selected group of the included ones of the plurality of pan-tilt-zoom cameras of the one of the plurality of layouts are displayed on a plurality of windows.

14. The apparatus as in claim 10 wherein each of the plurality of layouts includes a respective name.

15. The apparatus as in claim 14 further comprising a processor that displays the menu on the user interface including the respective name of each of the plurality of layouts.

16. The apparatus as in claim 15 wherein the user input includes selecting the respective name of the one of the plurality of layouts.

17. An apparatus comprising:
    a security system that protects a secured geographic area;
    a plurality of pan-tilt-zoom cameras of the security system, wherein each of the plurality of pan-tilt-zoom cameras has a respective field of view that covers a respective portion of the secured geographic area;
    a user interface of the security system that displays respective real time video images from each of the plurality of pan-tilt-zoom cameras; and
    a plurality of layouts saved in a memory, wherein each of the plurality of layouts includes a respective previously selected group of included ones of the plurality of pan-tilt-zoom cameras and respective pan, tilt, and zoom positions for each of the respective previously selected group of the included ones of the plurality of pan-tilt-zoom cameras, wherein the user interface receives user input selecting one of the plurality of layouts from a menu displayed on the user interface and, simultaneously therewith, displays the respective real time video images from each of the respective previously selected group of the included ones of the plurality of pan-tilt-zoom cameras of the one of the plurality of layouts and orients the respective previously selected group of the included ones of the plurality of pan-tilt-zoom cameras of the one of the plurality of layouts to the respective pan, tilt, and zoom positions.

18. The apparatus as in claim 17 wherein each of the plurality of layouts includes a respective name.

19. The apparatus as in claim 18 further comprising a processor that displays the menu on the user interface including the respective name of each of the plurality of layouts.

* * * * *